(12) United States Patent
Boffelli et al.

(10) Patent No.: US 11,318,645 B2
(45) Date of Patent: May 3, 2022

(54) DISTRIBUTOR DEVICE

(71) Applicant: SACMI COOPERATIVA MECCANICI IMOLA SOCIETA' COOPERATIVA, Imola (IT)

(72) Inventors: Alessandro Boffelli, Cassina de' Pecchi (IT); Maurizio Borgatti, Imola (IT); Davide Baldisserri, Imola (IT); Matteo Fazziani, Imola (IT); Gianluca Aldigeri, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 421 days.

(21) Appl. No.: 16/332,683

(22) PCT Filed: Sep. 13, 2017

(86) PCT No.: PCT/IB2017/055522
§ 371 (c)(1),
(2) Date: Mar. 12, 2019

(87) PCT Pub. No.: WO2018/051240
PCT Pub. Date: Mar. 22, 2018

(65) Prior Publication Data
US 2021/0039288 A1 Feb. 11, 2021

(30) Foreign Application Priority Data

Sep. 13, 2016 (IT) .................. 102016000091902

(51) Int. Cl.
*B29C 43/54* (2006.01)
*B29C 43/08* (2006.01)
(Continued)

(52) U.S. Cl.
CPC .............. *B29C 43/54* (2013.01); *B29C 43/08* (2013.01); *F16K 11/076* (2013.01); *F16K 11/0856* (2013.01); *B29C 2043/3283* (2013.01)

(58) Field of Classification Search
CPC . B29C 43/54; B29C 43/08; B29C 2043/3283; B29C 43/32;
(Continued)

(56) References Cited

U.S. PATENT DOCUMENTS 3,891,371 A 6/1975 Sokolow
4,060,364 A 11/1977 Gras
(Continued)

FOREIGN PATENT DOCUMENTS

BE 423397 9/1937
CN 104647670 A 5/2015
(Continued)

*Primary Examiner* — Jacob T Minskey
*Assistant Examiner* — S. Behrooz Ghorishi
(74) *Attorney, Agent, or Firm* — Pearne & Gordon LLP

(57) ABSTRACT

A distributor device is arranged for controlling a plurality of actuators, each of which is intended to open or close a corresponding mould.
The distributor device comprises a rotary part rotatable about an axis and connectable to the actuators, and a stator part in fluid communication with the rotary part.
The stator part is provided with:
  a low pressure distributor element, configured to selectively send an actuating fluid at a first pressure to the rotary part, so that one actuator of the plurality of actuators moves a first component and a second component of the corresponding mould closer to each other from a distanced position to an intermediate position;
  a high pressure distributor element, configured to selectively send an actuating fluid at a second pressure higher than the first pressure to the rotary part, so that the actuator moves the first component and the second
(Continued)

component of the corresponding mould closer to each other from the intermediate position to a forming position;

a maintaining distributor element, configured to selectively send an actuating fluid to the rotary part, so that the actuator maintains the first component and the second component in the forming position.

17 Claims, 5 Drawing Sheets

(51) Int. Cl.
  *F16K 11/076*   (2006.01)
  *F16K 11/085*   (2006.01)
  *B29C 43/32*   (2006.01)

(58) Field of Classification Search
  CPC ........... B29C 2043/5084; F16K 11/076; F16K 11/0856; F15B 13/0406; B30B 15/16; B30B 11/08; B30B 11/12; B30B 15/0023; B29L 2031/565

See application file for complete search history.

(56) References Cited

U.S. PATENT DOCUMENTS

| | | |
|---|---|---|
| 6,074,583 A | 6/2000 | Ingram |
| 2009/0140462 A1 | 6/2009 | Balboni et al. |
| 2011/0180967 A1 | 7/2011 | Balboni et al. |
| 2011/0183024 A1 | 7/2011 | Balboni et al. |

FOREIGN PATENT DOCUMENTS

| | | |
|---|---|---|
| EP | 0903212 | 3/1999 |
| FR | 1288003 | 3/1962 |
| KR | 1020010112821 A | 12/2001 |

DISTRIBUTOR DEVICE

BACKGROUND OF THE INVENTION

Field of the Invention

The invention relates to a distributor device for distributing an actuating fluid to a plurality of moulds of a moulding machine. The moulding machine in which the distributor device is intended to be included can be, for example, a compression moulding machine for producing objects made of polymeric material by compression moulding. In this case, the distributor device is connected to a plurality of moulds each of which is intended to receive a dose of polymeric material and to compress such dose, so as to obtain the desired object.

Description of Related Art

Compression moulding machines are known comprising a carousel that is rotatable about a vertical axis. The carousel supports, in a peripheral region thereof, a plurality of moulds, each of which is suitable for forming an object made of polymeric material.

Each mould comprises a female element, provided with a cavity in which a dose of polymeric material in the molten state is deposited. Each mould further comprises a male element, intended to cooperate with the female element for shaping the dose and obtaining the desired object.

The female element and the male element are mutually movable between a distanced position, in which the dose can be deposited in the cavity of the female element, and a forming position, in which between the female element and the male element, a forming cavity is identified, the forming cavity having a shape that corresponds to the desired object.

In order to displace the female element and the male element from the distanced position to the forming position or vice versa, it is possible to move the female element with respect to the male element along a vertical direction. To this end, the female element can be mounted on the top end of a stem of a hydraulic actuator having the function of moving the female element according to a pre-established law of motion.

Each hydraulic actuator is supplied with an actuating fluid, typically oil, coming from a common source. The actuating fluid passes through a rotating joint provided with a rotary part, which is rotatable with the carousel, and a stator part.

The rotary part of the rotating joint is in fluid communication with a plurality of valves, each of which is associated with a hydraulic actuator that moves a respective female element. Each valve allows the actuating fluid to be sent to the corresponding hydraulic actuator, and respectively to be discharged from the corresponding hydraulic actuator, according to pre-established laws. To this end, each valve is equipped with a slide controlled by a cam. The valves therefore have the function of allowing the actuating fluid coming from the rotating joint to flow towards the hydraulic actuators only in pre-fixed steps of the stroke of such actuators.

Examples of machines of this kind are disclosed in US 2011/0183024 and in CN 104647670.

A drawback of compression moulding machines of the type described above is that, since such machines can comprise even some tens of moulds, a very high number of valves must be provided. This implies significant structural complexity of the compression moulding machine.

The high number of valves also has an impact, which cannot be neglected, on the cost of the compression moulding machine.

Furthermore, the valves have a negative influence on the reliability of the moulding machine, since the valves are relatively delicate components, that may be subject to faults and need to be replaced or subjected to maintenance operations.

Machines are also known for stretch-blow moulding, in which an actuating fluid, particularly oil, is distributed to a plurality of rotatable moulds by means of a distributor. An example of these machines is disclosed in U.S. Pat. No. 3,891,371. The machine disclosed in U.S. Pat. No. 3,891,371 comprises a plurality of blowing moulds mounted on a pair of opposite rotatable plates. The opposite plates support respective half-moulds, each of which is connected to a stem of a hydraulic piston, slidable inside a cylinder. The oil that moves the stems passes through a distributor shaft housed in a rotatable sleeve. High and low pressure grooves are made on the distributor shaft, axially separated from one another, which allow the moulds to be alternatively opened or closed.

The distributor disclosed in U.S. Pat. No. 3,891,371 allows the use of a valve for each mould to be avoided. However, such device is not suitable for being used on a compression moulding machine, which requires different mould opening and closing methods with respect to a stretch-blow moulding machine.

An object of the invention is to improve moulding machines, particularly compression moulding machines, of the known type.

Another object is to provide a distributor device that allows at least one mould of a moulding machine, particularly of a compression moulding machine, to be closed and/or opened, in a precise and controlled way.

A further object is to simplify the structure of moulding machines, particularly compression moulding machines.

A further object is to improve the reliability of moulding machines, particularly compression moulding machines.

Still another object is to reduce the costs of moulding machines, particularly for compression moulding objects.

BRIEF SUMMARY OF THE INVENTION

According to the invention, a distributor device is provided for controlling a plurality of actuators, each of which is intended for opening or closing a corresponding mould, the distributor device comprising:
  a rotary part that is rotatable about an axis and connectable to the actuators of said plurality,
  a stator part in fluid communication with the rotary part, wherein the stator part is provided with:
    a low pressure distributor element configured to selectively send an actuating fluid at a first pressure to the rotary part, so that one actuator of said plurality moves a first component and a second component of the corresponding mould closer to each other from a distanced position to an intermediate position;
    a high pressure distributor element, configured to selectively send an actuating fluid at a second pressure higher than the first pressure to the rotary part, so that said actuator moves the first component and the second component of the corresponding mould closer to each other from the intermediate position to a forming position;
    a maintaining distributor element, configured to selectively send an actuating fluid to the rotary part, so that said actuator maintains the first component and the second component in the forming position.

In a second aspect of the invention, there is provided a distributor device for controlling a plurality of actuators, each of which is intended to open or close a corresponding mould, the distributor device comprising:
- a rotary part that is rotatable about an axis and connectable to the actuators of said plurality,
- a stator part in fluid communication with the rotary part, the stator part being delimited by an interface surface which faces a further interface surface delimiting the rotary part, wherein the stator part is provided with:
- a low pressure distributor element, configured to selectively send an actuating fluid at a first pressure to the rotary part, so that one actuator of said plurality moves a first component and a second component of the corresponding mould closer to each other from a distanced position to an intermediate position;
- a high pressure distributor element, configured to selectively send an actuating fluid at a second pressure higher than the first pressure to the rotary part, so that said actuator moves the first component and the second component of the corresponding mould closer to each other from the intermediate position to a forming position;
- a maintaining distributor element, configured to selectively send an actuating fluid to the rotary part, so that said actuator maintains the first component and the second component in the forming position, and wherein the rotary part is provided with a plurality of communication conduits each of which is intended to be in fluid communication with a corresponding actuator, the communication conduits opening on the further interface surface so that, during rotation of the rotary part about said axis, each communication conduit faces in sequence the low pressure distributor element, the high pressure distributor element and the maintaining distributor element.

Owing to the invention, it is possible to obtain a distributor device that allows the moulds of a moulding machine, particularly of the compression moulding type, to be opened or closed, in a simple and reliable way.

Indeed, the distributor device according to the invention allows, on one hand, each mould to be controlled by distributing an actuating fluid to the actuator associated with the mould, at a pressure selected as a function of the compression moulding step in which the mould is. Furthermore, the distributor device also allows the rotary part to be connected with the stator part, the rotary part being rotatable about the corresponding axis, together with the moulds of the moulding machine, whereas the stator part is fixed relative to a frame of the machine. The distributor device according to the invention therefore acts as a distributor rotating joint.

By providing the distributor elements directly on the distributor device according to the invention, it is possible to avoid use, for each mould, of a valve having the purpose of sending the actuating fluid to, and discharging the actuating fluid from, the corresponding actuator. This allows the structure of the moulding machine in which the distributor device is intended to be included to be simplified, the reliability of the machine to be increased and the costs thereof to be kept limited.

The low pressure distributor element, the high pressure distributor element and the maintaining distributor element further allow the actuating fluid to be sent to each actuator at a pressure chosen as a function of the step of the moulding cycle in which the mould controlled by the actuator at issue is.

In particular, the low pressure distributor element allows the first and the second component of the mould to be moved closer to each other relatively quickly, during an initial part of the closing step of the mould.

The high pressure distributor element allows the first component and the second component to be moved closer to each other at a relatively low mutual movement speed during a final part of the closing step of the mould, while simultaneously applying to the polymeric material shaped between the first component and the second component a pressure higher than the pressure previously applied through the low pressure distributor element.

Finally, the maintaining distributor element allows the mould to be kept closed while the object is cooling, while compensating for the shrinkage that the polymeric material undergoes when cooling and taking into consideration any leakage of the actuating fluid in the components of the moulding machine.

In an embodiment, the maintaining distributor element is configured to send an actuating fluid to the rotary part at a different pressure from the second pressure, i.e. from the pressure at which the actuating fluid is sent to the rotary part by the high pressure distributor element.

The pressure with which the actuating fluid is sent to the rotary part by the maintaining distributor element may in particular be lower than the second pressure, so as not to stress the components of the moulding machine more than necessary.

In an embodiment, the first component is a female mould element provided with a forming cavity.

Alternatively, the first component may be a support element, particularly intended to support a cap inside which the desired object will be formed.

In both cases, the second component may be a male mould element, i.e. a punch.

In an embodiment, the distanced position is a maximum opening position of the mould.

In the distanced position, a dose of polymeric material may be deposited in a fixed position relative to the first component and a formed object may be removed from the second component.

In an embodiment, the intermediate position is a position in which the dose of polymeric material comes into contact with the second component.

In an embodiment, the forming position is a maximum closing position of the mould.

In the forming position, between the first component and the second component a forming chamber is defined having a shape corresponding to the object to be obtained.

BRIEF DESCRIPTION OF THE SEVERAL VIEWS OF THE DRAWINGS

The invention can be better understood and actuated with reference to the accompanying figures of the drawings, which illustrate a non-limiting embodiment thereof, in which.

DETAILED DESCRIPTION OF THE INVENTION

Figure 1:
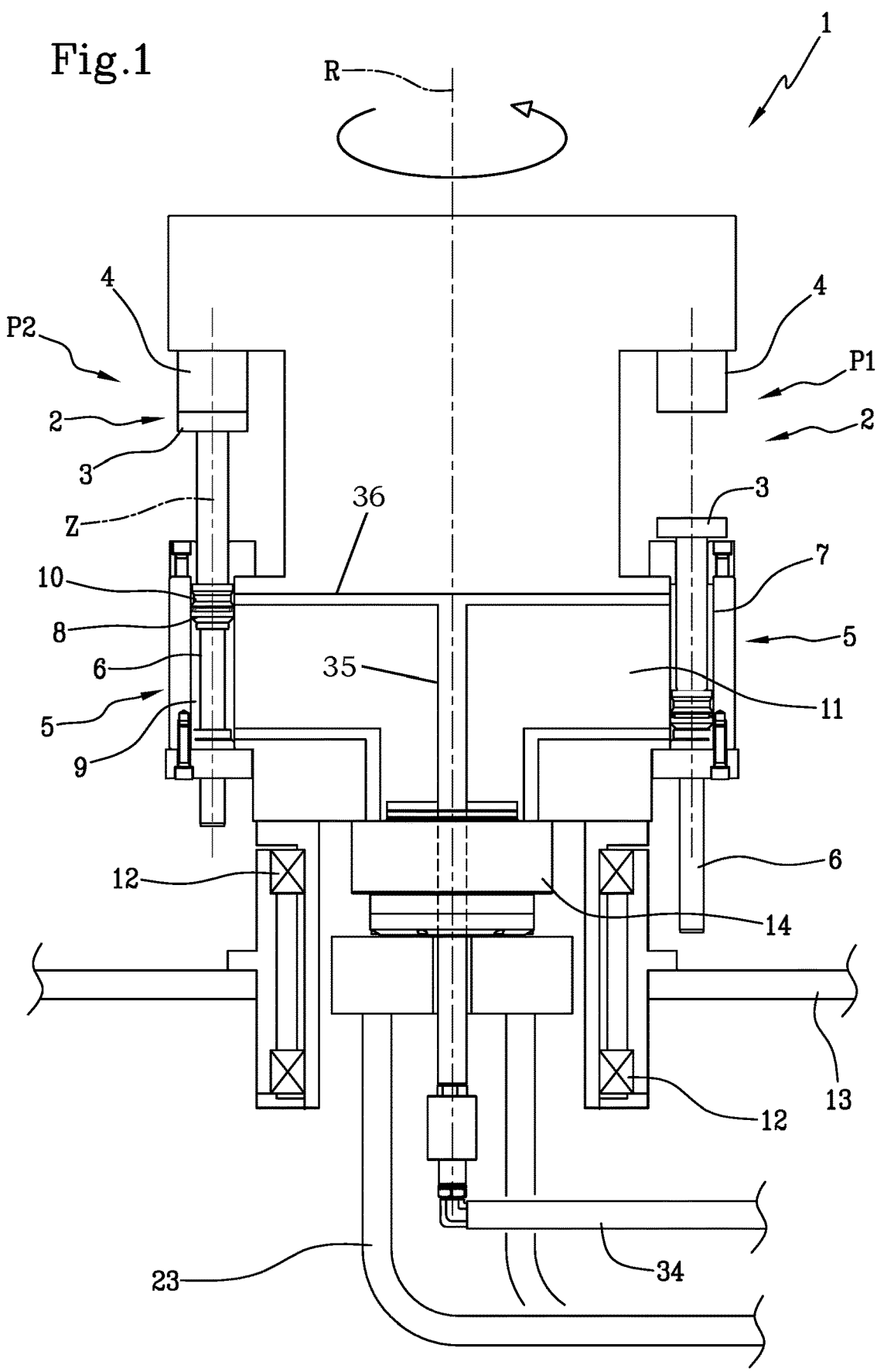
FIG. 1 is a schematic section of a forming carousel included in a compression moulding machine.

FIG. 1 shows a forming carousel 1 which is part of a compression moulding machine for compression moulding objects starting from doses of polymeric material. The moulding machine comprises an extruder for extruding a continuous extrudate of polymeric material and a cutting device for separating doses of polymeric material from the continuous extrudate. The cutting device is configured to separate the doses by cutting the continuous extrudate of polymeric material at pre-fixed distances. The moulding machine can further comprise a transport device, conformed for example like a transport carousel, for transporting the doses towards one or more moulds 2 in which an object having the desired shape will be obtained from each dose. In the example shown, a plurality of moulds 2 is provided, the moulds 2 being supported by the forming carousel 1, particularly supported by a peripheral region of the forming carousel 1. The forming carousel 1 is rotatable about an axis R which, in the example shown, is positioned vertically.

Each mould 2 comprises a first component or a female mould element 3 cooperating with a second component or male mould element 4. The female mould element 3, shown only schematically in FIG. 1, is provided with a cavity inside which a dose of polymeric material can be received. The male mould element 4 can instead be conformed like a punch suitable for penetrating into the cavity provided in the female mould element 3 for shaping the dose of polymeric material.

Each female mould element 3 and the corresponding male mould element 4 are aligned along a respective moulding axis Z, which in the example shown is arranged vertically.

Each female mould element 3 and the corresponding male mould element 4 are movable with respect to one another between a distanced position P1, shown in the right part of FIG. 1, and a forming position P2, shown in the left part of FIG. 1.

In the distanced position P1, the female mould element 3 and the corresponding male mould element 4 are distanced from one another, so that it is possible to insert a dose of polymeric material into the cavity of the female mould element 3 and remove an already formed object, still coupled to the male mould element 4, from the mould 2. In the distanced position P1, the mould 2 is therefore in a maximum opening configuration. In the forming position P2, the female mould element 3 and the corresponding male mould element 4 are close to one another, so that between them a forming chamber is defined, the forming chamber having a shape corresponding to the shape of the object to be obtained. In the forming position P2, the mould 2 is therefore in a closed configuration.

Between the distanced position P1 and the forming position P2, the female mould element 3 and the male mould element 4 may be arranged in a plurality of partial opening positions, between which an intermediate position not shown is worthy of note. In this intermediate position, the dose deposited in the cavity of the female mould element 3 comes into contact with the male mould element 4, so as to start to be deformed between the female mould element 3 and the male mould element 4.

Each mould 2 is associated with an actuator 5 arranged to open and/or close the mould 2, by mutually moving the female mould element 3 and the male mould element 4 between the distanced position P1 and the forming position P2.

In the example shown, each actuator 5 is associated with the female mould element 3, i.e. each actuator 5 moves the female mould element 3 along the corresponding moulding axis Z, while the male mould element 4 remains in a fixed position along the moulding axis Z. It is however possible also to envisage a case in which the actuator 5 moves the male mould element 4, while the female mould element 3 remains in a fixed position along the moulding axis Z. Alternatively, both the female mould element 3 and the male mould element 4 could be movable along the moulding axis Z.

Each actuator 5 moves the corresponding mould 2 owing to an actuating fluid that can be for example oil (in which case the actuator 5 is of the hydraulic type) or compressed air or another gas (in which case the actuator 5 is of the pneumatic type).

In the example shown, each actuator 5 comprises a stem 6, which supports the female mould element 3 at an end thereof, for example at an upper end of the stem 6.

Each actuator 5 further comprises a cylinder 7, inside which the stem 6 is movable. The stem 6 may be provided with an enlarged portion 8, which identifies a first chamber 9 or lower chamber and a second chamber 10 or upper chamber inside the cylinder 7.

The actuating fluid is contained both in the first chamber 9 and in the second chamber 10, so that the cylinder 7 behaves like a double effect cylinder.

In particular, when the actuating fluid sent into the first chamber 9 has a higher pressure than the actuating fluid sent into the second chamber 10, the female mould element 3 is moved towards the male mould element 4. On the contrary, when the actuating fluid sent into the second chamber 10 has a higher pressure than the actuating fluid sent into the first chamber 9, the female mould element 3 moves away from the male mould element 4.

The cylinder 7 is fixed with respect to a rotatable drum 11 of the forming carousel 1.

The rotatable drum 11 supports the female mould elements 3, through the actuators 5.

The rotatable drum 11 also supports the male mould elements 4.

A motor device not shown allows the rotatable drum 11 to rotate about the axis R, also owing to a pair of bearings 12 mounted on a fixed frame 13 of the moulding machine.

A distributor device 14 is further provided for distributing to the actuators 5 the corresponding actuating fluid, according to the compression moulding steps in which the moulds 2 associated with the actuators 5 are. The distributor device 14 is shown in detail in FIGS. 2 to 4. In particular, the distributor device 14 allows the actuating fluid to be distributed to the first chamber 9 of each actuator 5. The distributor device 14 therefore allows the actuators 5 to be controlled, so that each actuator 5 is, at any pre-set moment, in the desired position.

Figure 2:
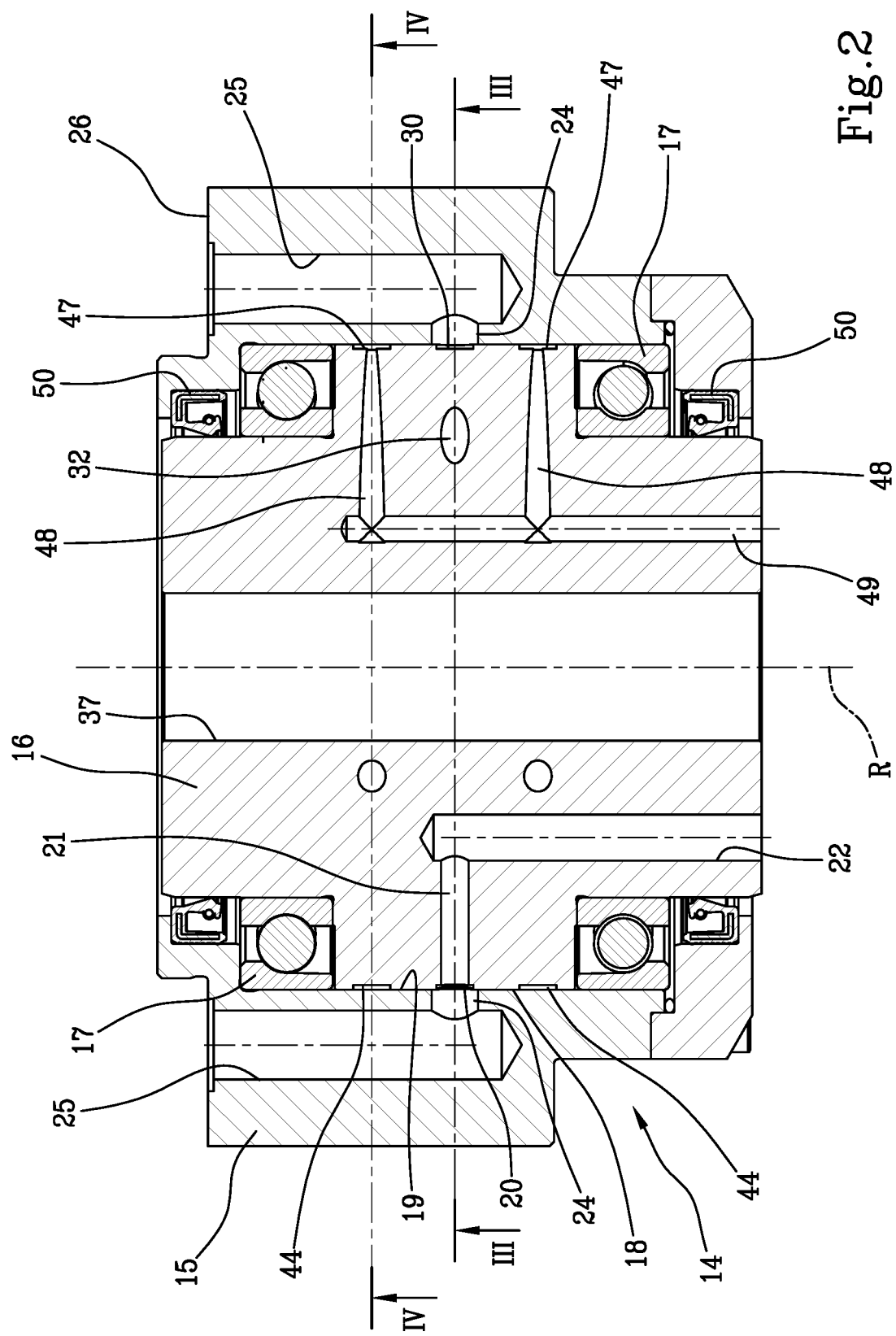
FIG. 2 is a schematic section showing a distributor device of the forming carousel of FIG. 1.

As shown in FIG. 2, the distributor device 14 comprises a rotary part 15 rotatable about the axis R and connectible to the actuators 5. The rotary part 15 is fixed with respect to the rotatable drum 11.

The distributor device 14 further comprises a stator part 16 intended to be selectively placed in fluid communication with the rotary part 15. The rotary part 15 is rotatable with respect to the stator part 16, which instead remains in a fixed position about the axis R. To this end, two bearings 17 are interposed between the stator part 16 and the rotary part 15.

In the example shown, the stator part 16 and the rotary part 15 are coaxial to one another, i.e. they both extend around the axis R.

The rotary part 15 surrounds the stator part 16.

Figure 5:
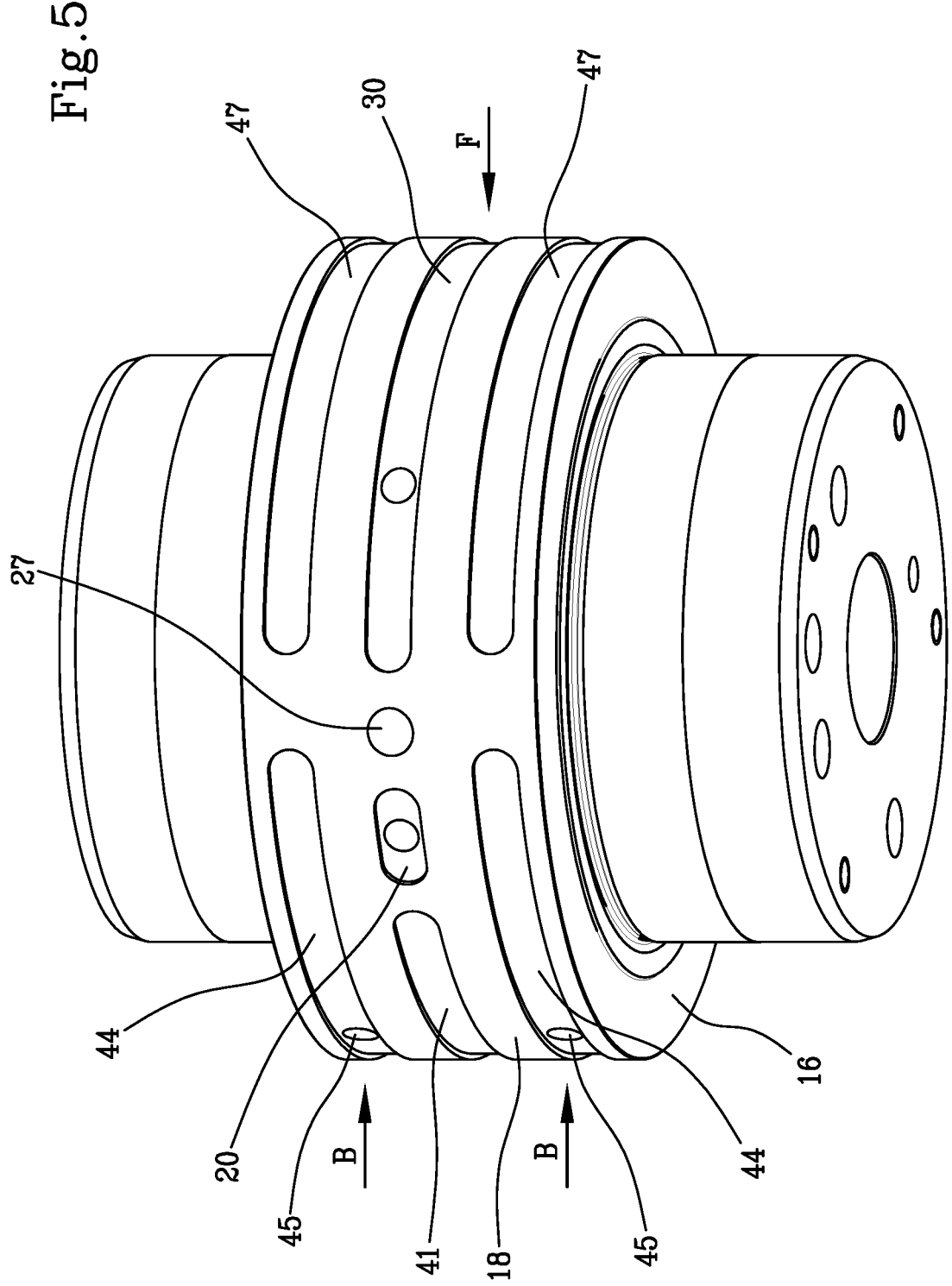
FIG. 5 is a perspective view showing a portion of the distributor device of FIG. 2.

The stator part 16 is radially delimited by an interface surface 18, more clearly visible in FIG. 5, which extends around the axis R. The interface surface 18 can be conformed like a portion of a cylindrical surface coaxial with the axis R. The interface surface 18 faces a further interface surface 19, which internally delimits the rotary part 15.

The interface surface 18 is substantially in contact with the further interface surface 19. More precisely, between the further interface surface 19 and the interface surface 18, a very small radial clearance is provided.

On the further interface surface 19 a plurality of communication conduits 24 open, the communication conduits 24 being provided in the rotary part 15. Each communication conduit 24 can be arranged transversally, in particular perpendicularly, to the axis R. From each communication conduit 24 a connection conduit 25 starts, which in the example shown extends parallel to the axis R and opens onto an end surface 26 of the rotary part 15. The end surface 26, in use, faces towards the rotary drum 11.

Each communication conduit 24 is in fluid communication with the actuator 5, in particular with the first chamber 9 of the actuator 5, through the connection conduit 25 and one or more further conduits made in the rotary drum 11.

In the example shown, the communication conduits 24 are coplanar, i.e. they extend along respective axes arranged on a common plane.

The stator part 16 is provided with a low pressure distributor element, configured to selectively send an actuating fluid at a first pressure to the rotary part 15, particularly a low pressure actuating fluid having a relatively low pressure.

More in particular, the low pressure distributor element is configured to send the respective actuating fluid, in sequence, to each actuator 5 associated with a mould 2, so as to move the female mould element 3 closer to the male mould element 4, by moving the female mould element 3 with respect to the male mould element 4 from the distanced position P1 to the intermediate position.

Figure 3:
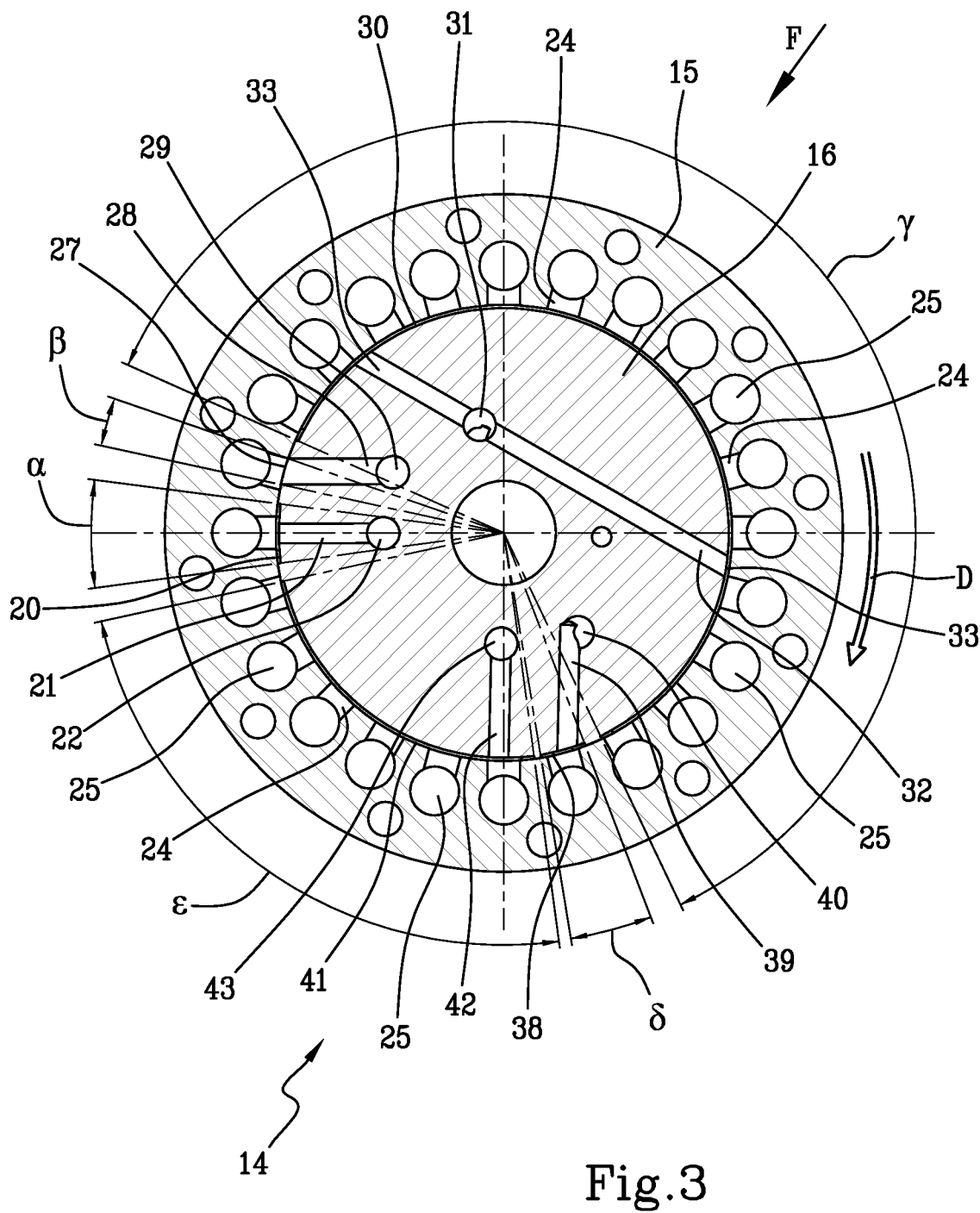
FIG. 3 is a section taken along the plane of FIG. 2.

The low pressure distributor element comprises a recess conformed for example like a low pressure distributor groove 20, shown in FIGS. 2, 3 and 5, made on the interface surface 18 of the stator part 16.

The low pressure distributor groove 20 communicates with a source of actuating fluid, particularly through a transversal hole 21 and a longitudinal hole 22 made in the stator part 16. The transversal hole 21 is arranged transversely, in particular perpendicularly, to the axis R, while the longitudinal hole 22 may be parallel to the axis R. The longitudinal hole 22 is intended to be connected to the source of actuating fluid through a supply line 23 shown in FIG. 1.

The low pressure distributor groove 20 extends along a centre line lying on a plane perpendicular to the axis R. The low pressure distributor groove 20 therefore extends at a pre-fixed level along the axis R. The low pressure distributor groove 20 has an angular extension α, visible in FIG. 3, around the axis R.

The low pressure distributor groove 20 extends on the same level on which the communication conduits 24 of the rotary part 15 open. Therefore, when the rotary part 15 rotates about the axis R with respect to the stator part 16, all the communication conduits 24 face, one after the other, the low pressure distributor groove 20, for an angle of rotation of the rotary part 15 corresponding to the angular extension α of the low pressure distributor groove 20.

In this way, the low pressure actuating fluid can pass from the stator part 16 to the rotary part 15. More in particular, the low pressure actuating fluid can pass from the low pressure distributor groove 20 to each communication conduit 24, when the communication conduits 24, one after the other, face the low pressure distributor groove 20.

The angular extension α during which each communication conduit 24 remains in fluid communication with the low pressure distributor groove 20 corresponds to the interval of time during which each actuator 5 moves the corresponding female mould element 3 from the distanced position P1 to the intermediate position. During this interval of time, the female mould element 3 does not still interact with the male mould element 4. In other words, the dose of polymeric material is deposited inside the cavity of the female mould element 3, but it is not yet in contact with the male mould element 4. This means that the dose is still undeformed. Therefore, the polymeric material that forms the does not yet exert a force that tends to separate the male mould element 4 from the female mould element 3.

The low pressure fluid sent through the low pressure distributor element has a relatively low pressure and a relatively high flow rate. The stem 6 of the actuator 5 can therefore be moved, and the female mould element 3 can be displaced towards the male mould element 4, at a relatively high speed and with a relatively low force. Owing to the relatively high speed, it is possible to keep the cycle time limited, while the relatively low force is sufficient to move the female mould element 3 closer to the male mould element 4 without excessively stressing the moulding machine components, owing to the fact that during this step the polymeric material to be deformed does not yet exert any action on the mould 2.

The stator part 16 is also provided with a high pressure distributor element, configured to selectively send a high pressure actuating fluid to the rotary part 15, i.e. an actuating fluid at a second pressure which is higher than the first pressure, i.e. higher than the pressure with which the actuating fluid is sent to the rotary part 15 by the low pressure distributor element.

The high pressure distributor element is in particular configured to send in sequence the actuating fluid at high pressure to each actuator 5, more precisely to the relative first chamber 9, so that the actuator 5 further moves the relative female mould element 3 closer to the male mould element 4, by moving the corresponding female mould element 3 from the intermediate position to the forming position P2.

The terms "low pressure" and "high pressure" are to be considered in this description in a relative sense, i.e. as simply referring to the fact that the low pressure actuating fluid has a pressure lower than the high pressure actuating fluid. However, reference is not intended to be made to a specific pressure value.

The high pressure actuating fluid has a higher pressure than the low pressure actuating fluid, in order to allow the female mould element 3 to be pushed towards the male mould element 4 with a relatively high force, so as to overcome resistance of the polymeric material that is being deformed between the female mould element 3 and the male mould element 4 for obtaining an object of the desired shape. Simultaneously, the high pressure actuating fluid has a relatively low flow rate, in particular lower than the flow rate of the low pressure actuating fluid, so that the female mould element 3 is moved relatively slowly towards the male mould element 4. This allows the polymeric material forming the dose to flow more easily between the female mould element 3 and the male mould element 4, so as to gradually fill the entire forming chamber.

As shown in FIGS. 3 and 5, the high pressure distributor element may comprise a high pressure recess or opening 27, particularly shaped like a hole, for example circular, made on the interface surface 18 of the stator part 16. In an alternative embodiment, the high pressure distributor opening 27 may be shaped not like a circular hole, but have a different shape. The high pressure distributor opening 27 is in fluid communication with a supply line not shown, which sends the high pressure actuating fluid to the high pressure distributor opening 27. To this end, between the high pressure distributor opening 27 and the respective supply line a transversal passage 28 and a longitudinal passage 29 can be interposed, both made in the stator part 16. The transversal passage 28 is arranged transversely, in particular perpendicularly, to the axis R and opens into the high pressure distributor opening 27. The longitudinal passage 29 extends parallel to the axis R and is interposed between the transversal passage 28 and the supply line.

The high pressure distributor opening 27 has an angular extension β around the axis R. The angular extension β corresponds to the time interval required for the mould 2 to pass from the intermediate position to the forming position P2. The angular extension β of the high pressure distributor opening 27 may be smaller than the angular extension α of the low pressure distributor groove 20. If this is the case, the high pressure distributor element controls each actuator 5 for a shorter period of time than the period of time in which each actuator 5 is controlled by the low pressure distributor element.

In an alternative embodiment, the angular extension β of the high pressure distributor opening 27 may be greater than or equal to the angular extension α of the low pressure distributor groove 20.

The centre of the high pressure distributor opening 27 is at the same height, measured along the axis R, as the centre line of the low pressure distributor groove 20. In other words, the high pressure distributor opening 27 and the low pressure distributor groove 20 are at the same level along the axis R. Therefore, when the rotary part 15 rotates about the axis R with respect to the stator part 16, each communication conduit 24 made on the rotary part 15 faces first the low pressure distributor groove 20 and then the high pressure distributor opening 27. In this way, the first chamber 9 of each actuator 5 receives in sequence the low pressure actuating fluid and the high pressure actuating fluid.

On the stator part 16 a maintaining distributor element is further provided, configured to selectively send to the rotary part 15 an actuating fluid or maintenance fluid at a maintenance pressure. The maintaining distributor element controls in sequence each actuator 5 for maintaining the corresponding mould 2 in the forming position P2, i.e. in the closed position. In other words, the maintenance fluid sent through the maintaining distributor element pushes the stem 6 and therefore the female mould element 3 associated with each actuator 5 towards the male mould element 4, so as to prevent the female mould element 3 from moving away from the male mould element 4 and consequently prevent the mould 2 from opening.

The pressure of the maintenance fluid sent through the maintaining distributor element is calculated so as to overcome the force with which the polymeric material, crushed between the male mould element 4 and the female mould element 3, would tend to push such elements away from each other. The aforementioned pressure is further calculated so as to maintain the female mould element 3 and the male mould element 4 in contact with the polymeric material, despite the latter being subject to heat shrinkage during cooling and despite any losses of actuating or maintenance fluid due to leakage through the components of the distributor device 14 and possible adjacent devices.

The pressure of the maintenance fluid sent through the maintaining distributor element is normally different from, in particular lower than, the pressure of the high pressure actuating fluid sent through the high pressure distributor element. Furthermore, the pressure of the maintenance fluid sent through the maintaining distributor element can be different from, in particular higher than, the pressure of the low pressure actuating fluid sent through the low pressure distributor element.

Figure 4:
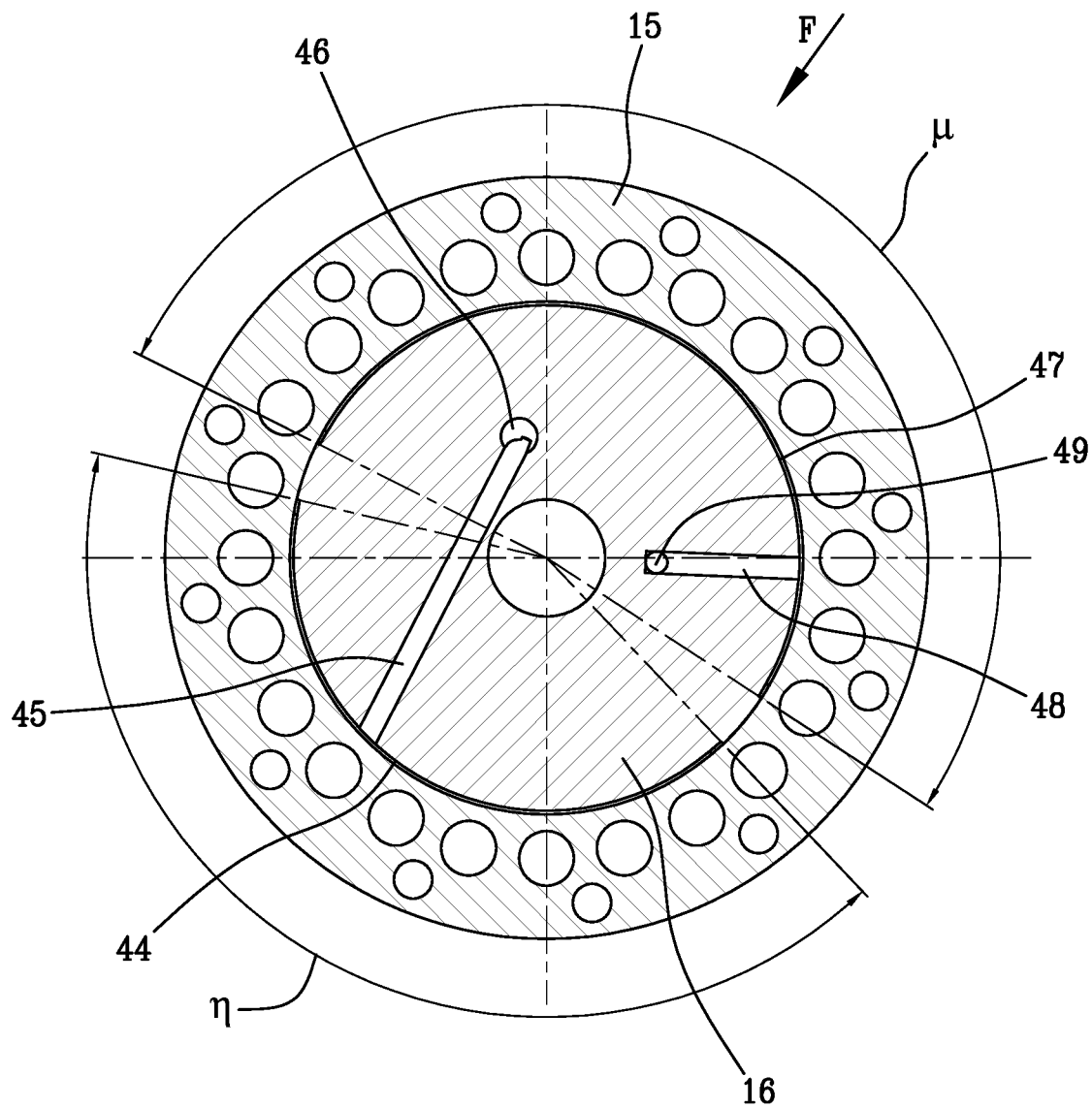
FIG. 4 is a section taken along the plane IV-IV of FIG. 2.

As shown in FIGS. 3 to 5, the maintaining distributor element may comprise a maintaining distributor recess or groove 30 made on the interface surface 18 of the stator part 16. The maintaining distributor groove 30 is in fluid communication with a source of the maintenance fluid not shown through a longitudinal conduit 31 and a transversal conduit 32. In the example shown, the longitudinal conduit 31 extends parallel to the axis R through the stator part 16. Instead, the transversal conduit 32 extends transversely, in particular perpendicularly, to the axis R, still within the stator part 16. The transversal conduit 32 connects the longitudinal conduit 31 to the maintaining distributor groove 30. In particular, the longitudinal conduit 31 opens in an intermediate region of the transversal conduit 32. The latter has two open opposite ends 33 shown in FIG. 3, each of which opens into the maintaining distributor groove 30.

The maintaining distributor groove 30 has an angular extension γ around the axis R which is greater both than the angular extension α of the low pressure distributor groove 20 and the angular extension β of the high pressure distributor opening 27. This means that the time during which each actuator 5 maintains the corresponding mould 2 in the forming position P2 is longer than the time needed by each actuator 5 to close the mould 2 by passing from the distanced position P1 to the intermediate position and from the latter to the forming position P2. The angular extension γ is calculated so that each mould 2 remains in the forming position P2 for a sufficient amount of time so that the object formed in the mould 2 cools to a temperature at which such object can be handled without suffering any damage.

The maintaining distributor groove 30 extends along a centre line that is located at the same level, along the axis R, of the centre line of the low pressure distributor groove 20 and of the centre of the high pressure distributor opening 27. In other words, in the example shown, the centre line of the low pressure distributor groove 20, the centre of the high pressure distributor opening 27 and the centre line of the maintaining distributor groove 30 are on the same plane, in particular on a plane perpendicular to the axis R. Thus, when the rotary part 15 rotates about the axis R with respect to the stator part 16, each communication conduit 24, after facing the low pressure distributor groove 20 and the high pressure distributor opening 27, faces the maintaining distributor groove 30 from which it receives the maintenance fluid.

If D indicates a rotation direction of the stator part 15 about the axis R, the high pressure distributor opening 27 is arranged downstream of the low pressure distributor groove 20 and upstream of the maintaining distributor groove 30.

The second chamber 10 of each actuator 5 is constantly in fluid communication with a source of actuating fluid through a communication line 34, shown in FIG. 1, owing to which it is possible to send an actuating fluid to the second chamber 10 so as to control, in particular, a return stroke of the actuators 5. The communication line 34 is in fluid communication with the second chambers 10 through a system of conduits made in the rotatable drum 11. The system of conduits comprises a central conduit 35, visible in FIG. 1, from which a plurality of secondary conduits 36 branch off, the secondary conduits 36 being configured to connect the central conduit 35 with respective second chambers 10. The central conduit 35 is in fluid communication with the communication line 34 through a central hole 37 made in the stator part 16, in particular along the axis R, for example, coaxially with such axis.

Through the communication line 34, the central hole 37 and the system of conduits made in the rotatable drum 11, the second chamber 10 receives the actuating fluid continuously from the corresponding source. When each actuator 5 moves the corresponding female mould element 3 from the distanced position P1 to the intermediate position and from the latter to the forming position P2, the pressure of the actuating fluid sent into the first chamber 9 is higher than the pressure of the actuating fluid sent into the second chamber 10. Consequently, the volume of the first chamber 9 increases, while the volume of the second chamber 10 decreases, and the female mould element 3 moves closer to the male mould element 4.

Also when the mould 2 is maintained in the forming position P2, the pressure of the maintenance fluid sent into the first chamber 9 is higher than the pressure of the actuating fluid sent into the second chamber 10. In these conditions, the actuator 5 maintains the mould 2 in the forming position P2. More in particular, the position of the female mould element 3 is determined as a consequence of the balance that is determined with the force exerted by the polymeric material shaped between the female mould element 3 and the male mould element 4.

In the example shown, the central conduit 35 and the secondary conduits 46 are external to the distributor device 14.

In an alternative embodiment, the central conduit 35 and the secondary conduits 36 can be integrated into the distributor device 14, which in this case will have the function not only of distributing the actuating fluid to the first chambers 9 of the actuators 5, but also of distributing the actuating fluid to the second chambers 10.

The stator part 16 may also comprise an opening element configured to selectively connect the rotary part 15 with a tank, in order to move the female mould element 3 and the male mould element 4 away from each other in an initial opening step of each mould 2.

The opening element may be conformed as an opening recess or groove 38, shown in FIG. 3, arranged downstream of the maintaining distributor groove 30 with respect to the rotation direction D. The opening groove 38 extends along a centre line arranged at the same level, along the axis R, as the low pressure distributor groove 20, as the high pressure distributor opening 27 and as the maintaining distributor groove 30. The opening groove 38 has an angular extension δ around the axis R.

Through a transversal channel 39 and a longitudinal channel 40, made in the stator part 16, the opening groove 38 allows a part of the actuating fluid contained in the first chamber 9 of each actuator 5 to be discharged into the tank. When the communication conduit 24 associated with a determined actuator 5 is in a position facing the opening groove 38, the first chamber 9 is connected with the tank, in which there is a lower pressure than the pressure of the actuating fluid contained in the second chamber 10. Consequently, the stem 6 of the actuator 5 is moved so that the volume of the first chamber 9 is reduced, with consequent discharge of the relative actuating fluid into the tank. On the contrary, the volume of the second chamber 10 increases, owing to the actuating fluid coming from the communication line 34. The mould 2 therefore starts to open, because the female mould element 3 moves away from the corresponding male mould element 4. The opening groove 38 is connected to the tank through channels having a passage section so dimensioned that the female mould element 3 is moved away slowly, in this step, from the male mould element 4, in order to allow a gradual opening of the mould 2.

The stator part 16 may further comprise a discharge element for selectively connecting the rotary part 15 with the same tank with which the opening groove 38 communicates, for the purpose of discharging the actuating fluid contained in the first chamber 9 of each actuator 5 and therefore allowing the corresponding mould 2 to open completely. The discharge element may comprise a discharge recess or groove 41, shown in FIGS. 3 and 5, made on the interface surface 18 of the stator part 16. The discharge groove 41 communicates with the tank through a transversal discharge hole 42, directed transversely, in particularly perpendicularly, to the axis R. The transversal discharge hole 42 is interposed between the discharge groove 41 and a longitudinal discharge hole 43, directed parallel to the axis R. The transversal discharge hole 42 and the longitudinal discharge hole 43 are made in the stator part 16. A discharge line connects the longitudinal discharge hole 43 to the tank.

The discharge groove 41 has, around the axis R, an angular extension ε, that is greater than the angular extension δ of the opening groove 38.

The discharge groove 41 extends along a centre line arranged around the axis R at the same level as the centre line of the opening groove 38.

The discharge groove 41 is arranged downstream of the opening groove 38 with respect to the rotation direction D. In this way, after interacting with the opening groove 38, each communication conduit 24 associated with an actuator 5 interacts with the discharge groove 41. The first chamber 9 of each actuator 5 is thus connected, through the discharge groove 41, with the tank. The holes that connect the discharge groove 41 with the tank have passage sections so dimensioned that, when an actuator 5 is placed in communication with the discharge groove 41, the pressure of the actuating fluid contained in the second chamber 10 moves the stem 6 so as to rapidly reduce volume of the first chamber 9. The actuating fluid contained in the first chamber 9 is then sent into the tank and the female mould element 3 is moved further away from the male mould element 4 until reaching the distanced position P2.

In conclusion, when an actuator 5 is in fluid communication with the discharge groove 41, the corresponding female mould element 3 is moved more quickly with respect to when the actuator 5 was in fluid communication with the opening groove 38. The mould 2 can thus be quickly opened, therefore reducing the cycle time.

In an alternative embodiment, the opening groove 38 and the discharge groove 41, respectively, can be connected to distinct tanks, inside which there are different pressures, for opening the mould 2 with an initially lower and subsequently higher speed.

To summarise, the stator part 16 is provided, at the same level along the axis R, with the elements listed below, arranged in sequence along the rotation direction D:
- the low pressure distributor element, comprising for example the low pressure distributor groove 20;
- the high pressure distributor element, comprising for example the high pressure distributor opening 27;
- the maintaining distributor element, comprising for example the maintaining distributor groove 30;
- the opening element comprising for example the opening groove 38;
- the discharge element, comprising for example the discharge groove 41.

In the example shown, the opening groove 38 was distinct from the discharge groove 41.

In an alternative embodiment that is not shown, the opening groove 38 may be absent and, downstream of the maintaining distributor element, there may only be the discharge groove 41. In this case, the mould 2 is opened at a constant speed, by connecting the first chamber 9 directly with the discharge tank associated with the discharge groove 41, which remains in fluid communication with the actuator 5 for the time needed to move the female mould element 3 from the forming position P2 to the distanced position P1.

In the low pressure distributor groove 20, in the high pressure distributor opening 27, in the maintaining distributor groove 30, in the opening groove 38 and in the discharge groove 41 respective fluids are present having different pressures from one another. Due to the effect of the difference between pressures of such fluids, on the stator part 16 a resulting force F is generated directed radially with respect to the axis R. As shown in FIGS. 3 to 5, the resulting force F is substantially directed from the zone of the stator part 16 in which the high pressure distributor opening 27 and the maintaining distributor groove 30 extend, to a further zone of the stator part 16 in which the opening groove 38 and the discharge groove 41 extend.

In order to prevent this force from excessively stressing the components of the distributor device 14 and/or creating undesired deformations in such components, the distributor device 14 is provided with a balancing device configured to generate a balancing force capable of substantially balancing the resulting force F. The balancing device operates by exploiting an actuating fluid of the same type as that which is distributed to the moulds 2 by the distributor device 14. In other words, if the actuating fluid that the distributor device 14 distributes to the moulds 2 is a hydraulic fluid such as oil, the balancing device will also be of the hydraulic type.

In the example shown, the resulting force F lies on the same plane defined by the high pressure distributor opening 27 and by the maintaining distributor groove 30.

The balancing device is configured to generate two balancing forces B that, as shown in FIG. 5, lie on opposite sides of the plane defined by the resulting force F. In the example shown, a balancing force B is exerted on a plane arranged in a position higher than the plane defined by the resulting force F, while the other balancing force B is generated on a plane arranged in a position lower than the plane defined by the resulting force F.

The sum of the balancing forces B, which are parallel and have the same direction, is equal, or substantially equal, to the resulting force F. Since the resulting force F lies on a plane interposed between the planes on which the balancing forces B are generated, balance between the torques generated by the balancing forces B is also ensured.

In order that the balancing forces B can be generated, the stator part 16 is equipped with balancing arches 44, shown in FIGS. 4 and 5, provided on the interface surface 18. Each balancing arch 44 can be conformed as a recess made on the interface surface 18.

In particular, two balancing arches 44 are provided, each of which is configured to generate a balancing force B. The balancing arches 44 lie on two levels that are different from one another. Each level is identified by the centre line of the corresponding balancing arch 44, which extends on a prefixed plane.

In particular, the plane defined by the high pressure distributor opening 27 and by the maintaining distributor groove 30 is interposed between the planes defined respectively by one of the two balancing arches 44 and by the other balancing arch 44.

Each balancing arch 44 is in fluid communication with a source of fluid, for example oil, not shown, by means of a respective conduit 45, which extends in the stator part 16 transversely, in particular perpendicularly, to the corresponding balancing arch 44. Each conduit 45 connects the respective balancing arch 44 to a further conduit 46, which extends into the stator part 16 parallel to the axis R.

The further conduit 46 is in turn communicating with the source of fluid from which the fluid filling the balancing arches 44 comes.

Each balancing arch 44 has an angular extension $\eta$ around the axis R. In the example shown, the angular extension $\eta$ is slightly more than 180°.

In addition to the angular extension $\eta$, the other dimensions of the two balancing arches 44 can also be equal to one another.

The fluid which, through the conduit 45, fills each balancing arch 44, exerts on the walls of the balancing arch 44, and in particular on the respective bottom surface, a pressure which results in the balancing force B, calculated to balance the resulting force F. In particular, the angular extension $\eta$ of each balancing arch 44, as well as the corresponding dimensions along the axis R, are calculated in such a way that the sum of the two balancing forces B balances the resulting force originated by the radial forces due to the actuating fluid contained in the high pressure distributor opening 27, in the maintaining distributor groove 30, in the low pressure distributor groove 20, in the opening groove 38 and in the discharge groove 41.

Thus, undesired stress and breakages of the stator part 16 and of the bearings 17 are prevented.

In the embodiment shown, sliding seals are not provided between the interface surface 18 and the further interface surface 19, i.e. in the strip interposed between the bearings 17. Excessive leaks of actuating fluid are avoided owing to the reduced clearance existing between the stator part 16 and the rotary part 15. Despite this reduced clearance, the fluid contained in the low pressure distributor element, in the high pressure distributor element, in the maintaining distributor element, in the opening element (if provided) and in the discharge device can however penetrate longitudinally between the stator part 16 and the rotary part 15. In order to recover this fluid, the distributor device 14 can comprise a draining device for collecting such fluid and sending the collected fluid to a recovery tank that is not shown.

More precisely, the draining device allows the fluid contained in the longitudinal clearance existing between the stator part 16 and the rotary part 15 to be collected, in a zone defined axially between two sliding seals 50 between which the bearings 17 are interposed. In the radial direction, the draining device is active on a 360° extension around the axis R.

The draining device can comprise at least one collection recess 47 provided on the stator part 16, in particular on the interface surface 18. In the example shown, two collection recesses 47 are provided, each of which is conformed as an arched groove that extends around the axis R along an angular extension μ. In the example shown, the angular extension μ is slightly greater than 180°.

Each collection recess 47 extends along a centre line arranged on a plane that is transversal, in particular perpendicular, to the axis R.

The two collection recesses 47, or to be more precise, the corresponding centre lines, define planes that are different from one another, i.e. they extend on two different levels. The level on which the low pressure, high pressure and maintaining distributor elements extend is interposed between the two different levels on which the collection recesses 47 extend.

In particular, each recess 47 can extend on the same level as a corresponding balancing arch 44, in a position that is roughly diametrically opposite with respect to the corresponding balancing arch 44. This allows the axial dimensions of the distributor device 14 to be reduced.

Each recess 47 communicates with the recovery tank through a respective draining conduit 48, arranged transversely, in particular perpendicularly, to the axis R. The draining conduits 48 flow into a collection conduit 49, arranged parallel to the axis R, which is in fluid communication with the recovery tank.

The draining device is not essential for the correct operation of the distributor device 14. However, the draining device allows the pressure of the fluid acting on the two sliding seals 50 provided respectively above and below the strip identified by the bearings 17 to be reduced. In this way, the sliding seals 50 are not excessively stressed.

During operation, the rotatable drum 11, together with the moulds 2 and the actuators 5, are rotatingly driven about the axis R at a constant rotation speed. The rotary part 15 rotates together with the rotatable drum 11, since it is arranged in a fixed position relative to the rotatable drum 11. The stator part 16, on the contrary, remains fixed around the axis R, i.e. it does not rotate.

In the low pressure distributor groove 20, in the high pressure distributor opening 27 and in the maintaining distributor groove 30 of the stator part 16, the relative actuating fluids are contained at the desired pressures.

While the rotatable drum rotates in the rotation direction D, the communication conduit 24 communicating with a preset actuator 5 passes first in front of the low pressure distributor groove 20, which it temporarily faces, and from which it receives the corresponding low pressure fluid.

The latter fluid however has a pressure higher than the fluid contained in the second chamber 10 of the considered actuator 5, so that the corresponding stem 6 is displaced in such a way as to move the corresponding female mould element 3 closer to the male mould element 4. Movement of the female mould element 3 takes place quickly in this step, due to the high flow rate of the low pressure fluid, but without applying an excessive force to the female mould element 3, owing to the limited pressure of the fluid involved. Excessive forces applied to the female mould element 3 would be superfluous in this step, since the dose of polymeric material deposited in the cavity of the female mould element 3 does not yet interact with the male mould element 4.

The communication conduit 24 at issue remains facing the low pressure distributor groove 20 along an angle of rotation of the rotatable drum 11 corresponding to the angular extension α, so that the relative mould 2 passes from the distanced position P1 to the intermediate position, in which the dose contained in the cavity of the female mould element 3 comes into contact with the male mould element 4.

At this point, the communication conduit 24 no longer faces the low pressure distributor groove 20, but reaches a position in front of the high pressure opening 27, from which it receives a fluid at high pressure, having a relatively high pressure and a relatively low flow rate. The high pressure fluid reaches the first chamber 9 of the respective actuator 5 and, since it has a pressure higher than the pressure of the fluid contained in the second chamber 10, it pushes the female mould element 3 further towards the male mould element 4.

The dose of polymeric material is thus compressed between the female mould element 3 and the male mould element 4, until the desired object is obtained.

The communication conduit 24 at issue remains facing the high pressure distributor opening 27 for an angle of rotation of the rotatable drum 11 corresponding to the angular extension β, sufficient to bring the corresponding mould from the intermediate position to the forming position P2. At this point, the communication conduit 24 is disengaged from the high pressure distributor opening 27 and starts to interact with the maintaining distributor groove 30, which it faces. Through the maintaining distributor groove 30, in the communication conduit 24 a maintenance fluid flows at a sufficient pressure to maintain the corresponding mould 2 in the forming position P2, so that the object formed undergoes an initial cooling sufficient to handle the object without damaging it.

The pressure of the fluid sent through the maintaining distributor groove 30 is further sufficient to compensate for the heat shrinkage of the polymeric material that is being compression moulded, and to compensate for any leaks of the fluid at issue through the components of the distributor device 14.

After the communication conduit 24 has remained facing the maintaining distributor groove 30 for an angle of rotation of the rotatable drum 11 corresponding to the angular extension γ, the communication conduit 24 moves away from the maintaining distributor groove 30 and comes to face the opening groove 38. Though the opening groove 38, due to the effect of the pressure in the second chamber 10 of the respective actuator 5, a part of the actuating fluid contained in the first chamber 9 flows out from the actuator 5. Consequently, the female mould element 3 moves away from the male mould element 4 and the mould 2 starts to open. In this step, the movement of the female mould element 3 is still relatively slow.

Subsequently, the communication conduit 24 starts to interact with the discharge groove 41, through which most of the fluid contained in the first chamber 9 is quickly discharged into the tank. The mould 2 thus reaches again the distanced position P1, in which the formed object can detach from the male mould element 4 and a new dose of polymeric material can be inserted into the cavity of the female mould element 3 to be shaped.

The cycle described above is repeated for each mould 2 while the latter rotates about the axis R, when the corresponding communication conduit 24 faces in sequence the low pressure distributor element, the high pressure distributor element, the maintaining distributor element, the opening element and the discharge element.

In this way, the female mould element 3 and the male mould element 4 are moved with respect to one another simply and effectively, keeping in consideration the typical requirements of compression moulding.

In the example shown, all the communication conduits 24 extend along respective axes arranged on the same plane. The axes or centre lines of the low pressure groove 20, of the high pressure opening 27, of the maintenance groove 30, of the opening groove 38 and of the discharge groove 41 also lie on such plane.

In the case in which the forming carousel 1 comprises a very high number of moulds 2, it may be possible to double the levels on which the distributor elements and the communication conduits 24 extend.

In this case, the communication conduits 24 associated with a first group of moulds 2 extend along respective axes lying on a first common plane. The communication conduits 24 associated with a second group of moulds 2 extend along respective axes lying on a second common plane, distinct from the first common plane. The moulds belonging to the first group may alternate with the moulds belonging to the second group. For example, the moulds 2 belonging to the first group may be arranged in odd positions with respect to a pre-fixed starting point, while moulds 2 arranged in even positions may belong to the second group. Also the distributor elements, the opening element and the discharge element will in this case be arranged on two levels, so as to be able to communicate with the communication holes 24 of each group of moulds 2.

In the example shown, reference has been made to a situation in which the dose is shaped between a female forming element or first component and a male forming element or second component belonging to the mould, i.e. the female mould element 3 and the male mould element 4.

It is also possible to hypothesise a situation in which the dose is shaped in contact with an object that is not integrated into the mould, although behaving like a mould element during forming of the dose. This is the case that occurs, for example, in so-called "lining", in which the dose is shaped to obtain a seal inside a previously formed cap. More generally, the dose can be moulded inside the cavity of an object, so as to create a component anchored to the object.

In this case, the cap or more generally the object provided with a cavity inside which the dose is shaped acts like a female forming element, while the male forming element is integrated into the mould. The mould comprises, in this example, in addition to the second component or male mould element, also a first component or support element facing the male mould element and suitable for supporting the object inside which the dose must be shaped during moulding.

It is also possible to control passage between the intervals in which a preset mould 5 is in fluid communication respectively with the low pressure groove 20, the high pressure opening 27, the maintenance groove 30, the opening groove 38 and the discharge groove 41. This can be done, for example, by suitably shaping the geometries of the sections of the stator part 16 and of the rotary part 15 that progressively face each other.

The invention claimed is:

1. A distributor device for controlling a plurality of actuators, each of which is intended to open or close a corresponding mould, the distributor device comprising:
   a rotary part that is rotatable about an axis and connectable to the plurality of actuators,
   a stator part in fluid communication with the rotary part, the stator part being delimited by an interface surface which faces a further interface surface delimiting the rotary part, wherein the stator part is provided with:
   a low pressure distributor element, configured to selectively send a first actuating fluid at a first pressure to the rotary part, so that one actuator of said plurality of actuators mutually moves a first component and a second component of the corresponding mould closer to each other from a distanced position to an intermediate position;
   a high pressure distributor element, configured to selectively send a second actuating fluid at a second pressure higher than the first pressure to the rotary part, so that said one actuator mutually moves the first component and the second component of the corresponding mould closer to each other from the intermediate position to a forming position;
   a maintaining distributor element, configured to selectively send a third actuating fluid to the rotary part, so that said one actuator maintains the first component and the second component in the forming position,
   and wherein the rotary part is provided with a plurality of communication conduits each of which is intended to be in fluid communication with a corresponding actuator, the communication conduits opening on the further interface surface so that, during rotation of the rotary part about said axis, each communication conduit faces in sequence the low pressure distributor element, the high pressure distributor element and the maintaining distributor element.

2. The distributor device according to claim 1, wherein the maintaining distributor element is configured to send to the rotary part the third actuating fluid at a pressure different from said second pressure.

3. The distributor device according to claim 1, wherein the maintaining distributor element is configured to send to the rotary part the third actuating fluid at a pressure lower than said second pressure and higher than said first pressure.

4. The distributor device according to claim 1, wherein the interface surface and the further interface surface extend around said axis.

5. The distributor device according to claim 1, wherein the stator part is configured to interact with the rotary part on the interface surface facing the further interface surface of the rotary part, and wherein:
   the low pressure distributor element comprises a low pressure distributor recess made on the interface surface and connectable to a source of the first actuating fluid at the first pressure;
   the high pressure distributor element comprises a high pressure distributor recess made on the interface surface and connectable to a source of the second actuating fluid at the second pressure;
   the maintaining distributor element comprises a maintaining distributor recess made on the interface surface and connectable to a source of the third actuating fluid.

6. The distributor device according to claim 5, wherein the low pressure distributor recess, the high pressure distributor recess and the maintaining distributor recess extend in sequence around said axis along respective angular extensions.

7. The distributor device according to claim 5, wherein the low pressure distributor recess, the high pressure distributor recess and the maintaining distributor recess extend at a common level with respect to said axis.

8. The distributor device according to claim 7, wherein each communication conduit opens on the further interface surface at said common level, so that when the rotary part rotates with respect to the stator part, each communication conduit faces in sequence the low pressure distributor recess, the high pressure distributor recess and the maintaining distributor recess.

9. The distributor device according to claim 5, wherein the stator part further comprises a discharge element for selectively placing each actuator of the plurality of actuators in fluid communication with a discharge tank, so as to discharge a fluid present in a first chamber of each actuator of the plurality of actuators to open the corresponding mould, and wherein the discharge element comprises a discharge recess made on the interface surface of the stator part, the discharge recess extending at the same level as the low pressure distributor recess, the high pressure distributor recess and the maintaining distributor recess.

10. The distributor device according to claim 9, wherein the stator part further comprises an opening element configured to interact with each actuator of the plurality of actuators before each actuator of the plurality of actuators interacts with the discharge element, so as to discharge the fluid present in the first chamber of each actuator of the plurality of actuators with a discharge speed lower than the speed with which the discharge element discharges the fluid from the first chamber, and wherein the opening element comprises an opening recess made on the interface surface of the stator part, the opening recess being interposed between the maintaining distributor recess and the discharge recess and being located at the same level as the maintaining distributor recess.

11. The distributor device according to claim 5, and further comprising a balancing device for sending a balancing fluid between the stator part and the rotary part in order to balance a resulting force acting upon the stator part as a consequence of exchanges of the first actuating fluid, the second actuating fluid and the third actuating fluid between the stator part and the rotary part, and wherein the balancing device comprises a pair of balancing recesses made on the stator part at two different levels, said balancing recesses being connectable with a source of said balancing fluid, so as to generate respective balancing forces capable of balancing said resulting force, the low pressure distributor recess, the high pressure distributor recess and the maintaining recess extending at a common level interposed between said two different levels.

12. The distributor device according to claim 11, wherein the stator part comprises a draining device for sending into a recovery tank any leakage of actuating fluid that could occur between the rotary part and the stator part, and wherein the draining device comprises a pair of collection recesses, each of which is made on the stator part in a position that is diametrically opposite a balancing recess, each collection recess being connectable with the recovery tank.

13. The distributor device according to claim 1, wherein the stator part further comprises a discharge element for selectively placing each actuator of the plurality of actuators in fluid communication with a discharge tank, so as to discharge a fluid present in a first chamber of each actuator of the plurality of actuators to open the corresponding mould.

14. The distributor device according to claim 13, wherein the stator part further comprises an opening element configured to interact with each actuator of the plurality of actuators before each actuator of the plurality of actuators interacts with the discharge element, so as to discharge the fluid present in the first chamber of each actuator of the plurality of actuators with a discharge speed lower than the speed with which the discharge element discharges the fluid from the first chamber.

15. The distributor device according to claim 1, and further comprising a balancing device for sending a balancing fluid between the stator part and the rotary part in order to balance a resulting force acting upon the stator part as a consequence of exchanges of the first actuating fluid, the second actuating fluid and the third actuating fluid between the stator part and the rotary part.

16. The distributor device according to claim 1, wherein the stator part comprises a draining device for sending into a recovery tank any leakage of actuating fluid that could occur between the rotary part and the stator part.

17. The distributor device according to claim 1, wherein the stator part and the rotary part are coaxial with each other with respect to said axis, the rotary part at least partially surrounding the stator part.

* * * * *